(12) United States Patent
Sekine et al.

(10) Patent No.: US 11,511,226 B2
(45) Date of Patent: Nov. 29, 2022

(54) PROCESS GAS SUCTION STRUCTURE AND EXHAUST GAS TREATMENT APPARATUS

(71) Applicant: EBARA CORPORATION, Tokyo (JP)

(72) Inventors: Takafumi Sekine, Tokyo (JP); Kazutomo Miyazaki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 17/522,329

(22) Filed: Nov. 9, 2021

(65) Prior Publication Data

US 2022/0193605 A1 Jun. 23, 2022

(30) Foreign Application Priority Data

Dec. 21, 2020 (JP) .............................. JP2020-211316

(51) Int. Cl.
*B01D 47/06* (2006.01)
*B01D 53/75* (2006.01)
*B01D 53/78* (2006.01)
*B01D 53/79* (2006.01)

(52) U.S. Cl.
CPC ........... *B01D 53/78* (2013.01); *B01D 47/063* (2013.01); *B01D 53/75* (2013.01); *B01D 53/79* (2013.01); *B01D 2258/01* (2013.01)

(58) Field of Classification Search
CPC ...... B01D 53/78; B01D 47/063; B01D 53/75; B01D 53/79; B01D 2258/01; B05B 1/00
See application file for complete search history.

(56) References Cited

U.S. PATENT DOCUMENTS

2016/0096187 A1* 4/2016 Kakumu ............ B23Q 11/1076
239/123
2021/0057236 A1* 2/2021 Sekine ................ B01D 47/022

FOREIGN PATENT DOCUMENTS

| CA | 2 832 930 A1 * | 5/2014 | ............ B01D 53/14 |
| CN | 103 990 562 A * | 8/2014 | ............ B01D 53/60 |
| JP | 2017-211100 A | 11/2017 | |

* cited by examiner

*Primary Examiner* — Timothy C Vanoy
(74) *Attorney, Agent, or Firm* — Pearne & Gordon LLP (57) ABSTRACT

A process gas suction structure for preventing a generation of products from a process gas due to a temperature drop is disclosed. The process gas suction structure includes a double tube structure, and a heating device configured to heat the double tube structure. The double tube structure includes a process-gas flow passage portion where the process gas flows, and a partition portion arranged outside of the process-gas flow passage portion.

8 Claims, 7 Drawing Sheets

PROCESS GAS SUCTION STRUCTURE AND EXHAUST GAS TREATMENT APPARATUS

CROSS REFERENCE TO RELATED APPLICATION

This document claims priority to Japanese Patent Application No. 2020-211316 filed Dec. 21, 2020, the entire contents of which are hereby incorporated by reference.

BACKGROUND

A vacuum pump apparatus is widely used as one of manufacturing facilities for semiconductors, liquid crystals, solar panels, LEDs and the like. In these manufacturing processes and the like, a vacuum pump is connected to a vacuum chamber, and a process gas introduced into the vacuum chamber is evacuated by the vacuum pump.

The gas to be evacuated by the vacuum pump includes harmful flammable gases such as silane gas ($SiH_4$), dichlorosilane gas ($SiH_2Cl_2$) and ammonia ($NH_3$), or halogen-based persistent gases such as $NF_3$, $ClF_3$, $SF_6$, $CHF_3$, $C_2F_6$, and $CF_4$. Therefore, it is not possible to release such gases directly into the atmosphere. Conventionally, in the vacuum pump apparatus, an abatement apparatus (an example of an exhaust gas treatment apparatus) for treating to be made harmless the evacuated gas is provided a subsequent stage of the vacuum pump. There are two types of gas treatment to be made harmless processes: a wet type, which removes foreign substances and water-soluble components by bringing the process gas into contact with a liquid, and a combustion type, which burns the process gas.

In a wet type exhaust gas treatment apparatus, products are generated from the process gas in a suction portion of the exhaust gas treatment apparatus where the process gas is sucked due to a temperature drop, and these products may adhere to the suction portion. As a result, the exhaust gas treatment apparatus may break down or a treatment efficiency of the process gas may decrease.

SUMMARY

Therefore, there are provided a process gas suction structure and an exhaust gas treatment apparatus for preventing a generation of products from a process gas due to a temperature drop.

Embodiments, which will be described below, relate-to a process gas suction structure and an exhaust gas treatment apparatus.

In an embodiment, there is provided a process gas suction structure applicable to an exhaust gas treatment apparatus for treating to be made harmless a process gas by contacting it with a liquid, the process gas suction structure comprising: a double tube structure; and a heating device configured to heat the double tube structure, wherein the double tube structure comprises: a process-gas flow passage portion where the process gas flows; and a partition portion arranged outside of the process-gas flow passage portion.

In an embodiment, the process gas suction structure comprises a wall structure connected to the double tube structure, and wherein the heating device comprises: a first heating structure configured to heat a first heating space formed between the process-gas flow passage portion and the partition portion; and a second heating structure configured to heat a second heating space formed between the partition portion and the wall structure.

In an embodiment, the first heating structure comprises at least one of a first inert gas supply structure configured to supply a heated inert gas to the first heating space and a heater arranged to the first heating space, and wherein the second heating structure comprises at least one of a second inert gas supply structure configured to supply a heated inert gas to the second heating space and a heater arranged to the second heating space.

In an embodiment, the double tube structure comprises: an aperture portion configured to narrow a flow passage of an inert gas supplied from the first inert gas supply structure and passing through the first heating space; and an aperture portion configured to narrow a flow passage of an inert gas supplied from the second inert gas supply structure and passing through the second heating space.

In an embodiment, there is provided a process gas suction structure applicable to an exhaust gas treatment apparatus for treating to be made harmless a process gas by contacting it with a liquid, comprising: an annular flow passage structure; and a heating device configured to heat the annular flow passage structure, wherein the annular flow passage structure comprises: a process-gas flow passage portion where the process gas flows; and an annular zigzag flow passage portion arranged outside the process-gas flow passage portion.

In an embodiment, the zigzag flow passage portion comprises: a first annular projection formed an outer surface of the process-gas flow passage portion; and a second annular projection extending in a direction proximate to the outer surface of the process-gas flow passage portion.

In an embodiment, the heating device comprises an inert gas supply structure configured to supply a heated inert gas to the zigzag flow passage portion.

In an embodiment, there is provided an exhaust gas treatment apparatus, comprising: a suction casing comprising a process gas suction structure above described; and a liquid film forming portion configured to form a liquid film on an inner wall surface of the suction casing.

The process gas suction structure includes the heating device for heating the double tube structure. Therefore, the process gas suction structure can prevent a generation of products from a process gas due to a temperature drop.

DESCRIPTION OF EMBODIMENTS

Embodiments will be described below with reference to the drawings. In the drawings described below, the same or equivalent components are marked with the same sign and redundant explanations are omitted. The exhaust gas treatment apparatus in the embodiments is a wet type exhaust gas treatment apparatus for treating to be made harmless by bringing the process gas into contact with a liquid, and can be used as one of the manufacturing facilities for semiconductors, liquid crystals, solar panels, or LEDs, and the like.

Figure 1:
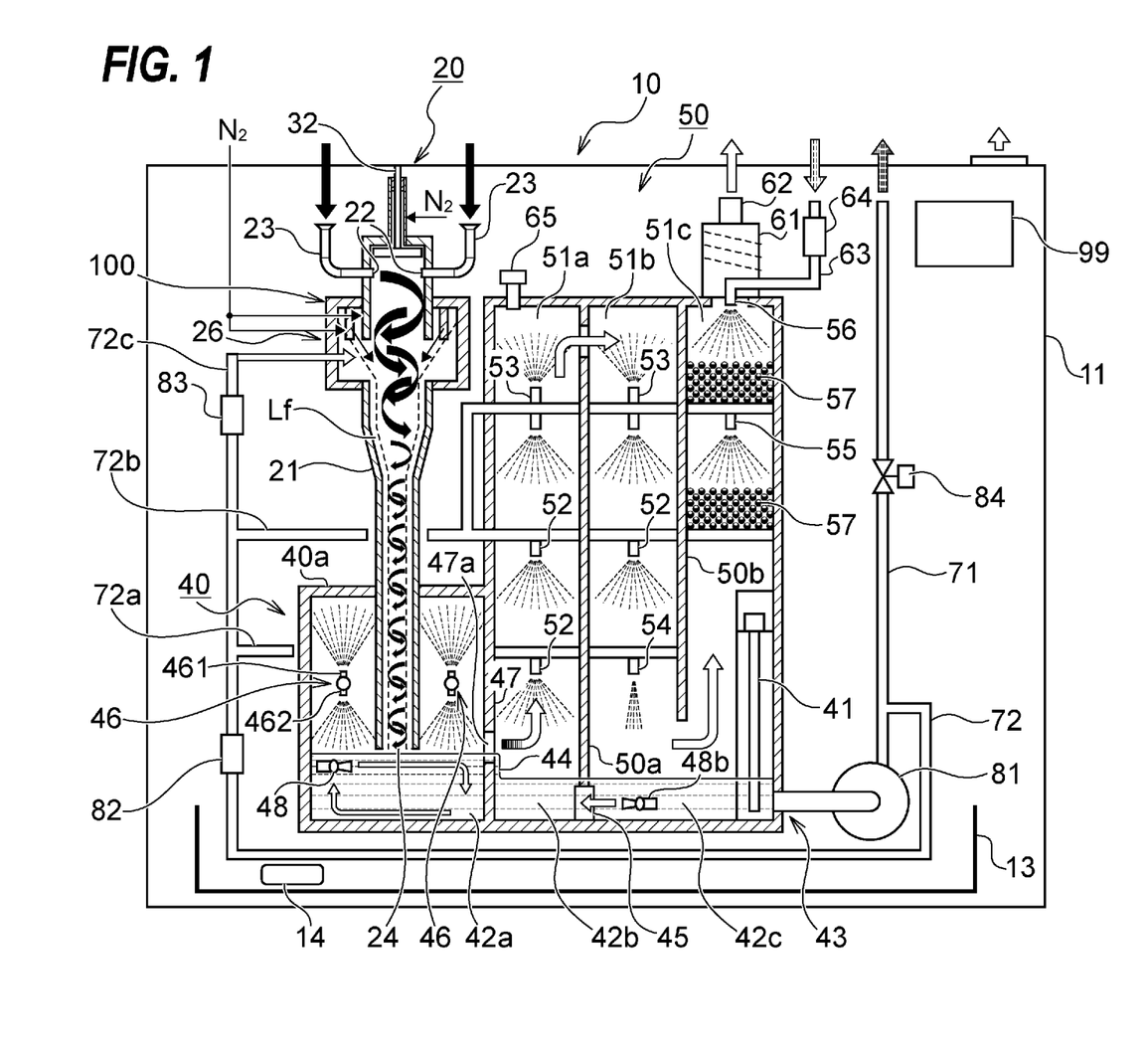
FIG. 1 is a view showing an embodiment of an exhaust gas treatment apparatus.

FIG. 1 is a view showing an embodiment of an exhaust gas treatment apparatus. The exhaust gas treatment apparatus 10 is provided for making harmless a gas (process gas) from the vacuum pump. A vacuum pump (not shown) is connected to the primary side (upstream side) of the exhaust gas treatment apparatus 10. The exhaust gas treatment apparatus of the embodiment may be used alone for making harmless the gas from the vacuum pump, or may be used together with another exhaust gas treatment apparatus (e.g., an abatement apparatus) such as a combustion type. For example, when all the gases to be removed contained in the gas evacuated by the vacuum pump are water-soluble components, the exhaust gas treatment apparatus 10 may be used alone. When the exhaust gas treatment apparatus 10 is used in combination with another exhaust gas treatment apparatus, it is preferable that the other exhaust gas treatment apparatus is connected to the subsequent stage of the exhaust gas treatment apparatus 10.

As shown in FIG. 1, the exhaust gas treatment apparatus 10 includes a suction casing 20 into which the process gas from a vacuum pump (not shown) is drawn, a liquid tank casing 40 connected to the suction casing 20, and a treatment casing 50 connected to the liquid tank casing 40. The liquid tank casing 40 and the treatment casing 50 may be integrated as a single casing.

The process gas sucked into the suction casing 20 is treated through the liquid tank casing 40 and the treatment casing 50, and then discharged outside or continued to be introduced into another exhaust gas treatment apparatus. The suction casing 20, the liquid tank casing 40, and the treatment casing 50 are located in a cabinet 11, and a drain pan 13 is provided at a bottom of the cabinet 11. The drain pan 13 includes a leak sensor 14 for detecting moisture. The leak sensor 14 is configured to monitor leakage from the components in the apparatus.

The exhaust gas treatment apparatus 10 includes a controller 99 for controlling each part of the exhaust gas treatment apparatus 10. The controller 99 includes, for example, a memory that stores various setting data and various programs, and a CPU that executes the programs in the memory.

The suction casing 20 of the embodiment is formed in a cylindrical shape as a whole. The shape of the suction casing 20 is not limited to the cylindrical shape, but can be any shape. A lower end (terminal side) of the suction casing 20 is arranged in the liquid tank casing 40. An opening at the lower end of the suction casing 20 constitutes an outlet 24 that conducts the process gas from the suction casing 20 into the liquid tank casing 40.

A suction port 22 is formed near an upper end of the suction casing 20, which is connected to the vacuum pump (not shown) via a suction pipe 23. The process gas sucked into the suction casing 20 through the suction port 22 is guided into the liquid tank casing 40 through the outlet 24.

A pipe heater (not shown) can be provided in the suction pipe 23 from the suction port 22 to the vacuum pump. The pipe heater heats the suction pipe 23 to a predetermined temperature (e.g., 180° C.) when the process gas flows through the suction pipe 23, and various heaters such as a jacket heater can be employed. The pipe heater can suppress foreign substances from accumulating in the suction pipe 23 and suction port 22. A pressure gauge configured to measure a pressure of the process gas may be provided in a gas flow passage (e.g., suction port 22, suction pipe 23, etc.) of the suction casing 20 to monitor blockage or non-blockage of the pipe.

A liquid film forming portion 26 is provided between the suction port 22 and outlet 24 of the suction casing 20 to form a liquid film (wet wall) Lf on an inner wall surface of the suction casing 20. The liquid film forming portion 26 of the embodiment is provided along the entire circumference in a circumferential direction of the ring-shaped suction casing 20. The formation of the liquid film Lf on the inner wall surface by the liquid film forming portion 26 allows foreign substances to be swept away by the liquid film near the inner wall surface of a pipe 21, thereby suppressing foreign substances such as reaction by-products from being deposited on the pipe 21. Hereinafter, reaction by-products will be referred to simply as products.

In the embodiment, a scraper 32 is provided at the upper end of the suction casing 20. The scraper 32 is operated at all times or from time to time to mechanically scrape off the products adhering to the inner wall surface of the suction casing 20. As a result, the scraper 32 suppresses the adhesion of the products to the inner wall surface of the suction casing 20.

As shown in FIG. 1, the lower end side of the suction casing 20 is arranged inside the liquid tank casing 40, and the outlet 24 of the suction casing 20 opens into the liquid tank casing 40. The liquid tank casing 40 is a circulation tank for storing liquid and reusing the stored liquid for the treatment of the exhaust gas treatment apparatus 10.

The liquid tank casing 40 has a liquid tank 42a, into which the liquid flowing, for example, as the liquid film Lf. The liquid tank 42a has a weir 44 on the downstream side, i.e., on the side of the treatment casing 50 from the outlet 24 of the suction casing 20. On the downstream side of the weir 44, liquid tanks 42b and 42c are arranged in the lower part of the treatment casing 50, and a filter 45 is arranged between the liquid tanks 42b and 42c.

The liquid that flows down from the outlet 24 of the suction casing 20 enters the liquid tank 42a once. Then, the liquid stored in the liquid tank 42a overflows the weir 44 and flows into the liquid tank 42b, passes through the filter 45, and flows into the liquid tank 42c. The liquid in the liquid tank 42c has a liquid outlet 43. The liquid in the liquid tank 42c is discharged through the liquid outlet 43.

The liquid tank 42a includes a wall 40a enclosing the upper, lower and side, and a wall 47 dividing the liquid tank 42a from the liquid tank 42b. The wall 47 has an opening 47a connecting the liquid tank 42a and the liquid tank 42b, and a part of the wall 47 below the opening 47a constitutes the weir 44. The liquid tank 42a is an overflow type liquid tank in which the stored liquid overflows the weir 44 and flows into the liquid tank 42b, so that the liquid level in the liquid tank 42a is maintained at a stable level.

The liquid tank 42a is provided with one or more spray nozzles 46. In this example, the spray nozzles 46 are provided and are arranged at equal intervals around the pipe 21 of the suction casing 20. Although FIG. 1 shows two spray nozzles 46, the number of spray nozzles 46 may be three or more.

Each spray nozzle 46 is arranged on a side of the suction casing 20 above the outlet 24. Each spray nozzle 46 is in fluid communication with the liquid flow passage 72a and is configured to receive a supply of liquid from the liquid flow passage 72a. Each spray nozzle 46 includes a first spray nozzle 461 that sprays the liquid upwardly and a second spray nozzle 462 that sprays the liquid downwardly.

The first spray nozzle 461 is configured to spray and sprinkle the liquid upward in the liquid tank 42a and cover the wall of the liquid tank 42a and an outer surface of the suction casing 20 with the liquid. The second spray nozzle 462 is configured to spray and sprinkle the liquid on the portion around the outlet 24 at the lower end of the suction casing 20 in the liquid tank 42a. The second spray nozzle 462 may be further configured to spray and sprinkle the liquid on the wall of the liquid tank 42a.

By spraying the liquid from each spray nozzle 46, the process gas introduced into the liquid tank 42a is brought into contact with the liquid to hydrolyze the process gas, and the products at the time of hydrolysis can be knocked off into the stored liquid by the sprayed liquid. It is possible to suppress the products from floating in the liquid tank casing 40.

By spraying the liquid from each spray nozzle 46 to the entire inside of the liquid tank 42a, the entire inside of the liquid tank 42a (the wall of the liquid tank 42a, the suction casing 20, etc) can be covered with the liquid. As a result, the entire interface that causes the adhesion of the products can be covered with the liquid film, and the adhesion of the product to the wall surface of the liquid tank 42a and the suction casing 20 can be suppressed. Since the first spray nozzle 461 sprays the liquid upward, a ceiling portion of the liquid tank casing 40 can also be effectively covered with the liquid.

In addition, by spraying liquid from around the area around the outlet 24 of the suction casing 20 with the second spray nozzle 462, the products generated by the reaction between the process gas and liquid in the vicinity of the outlet 24 of the suction casing 20 can be dropped into the stored liquid. This further suppresses the scattering of products from near the outlet 24 of the suction casing 20.

In FIG. 1, an eductor 48 is located in the liquid tank 42a. The eductor 48 is a device that is driven by a drive liquid, sucks a quantity of liquid that is several times larger than the drive liquid, and discharges the sucked liquid together with the liquid drive liquid. The eductor 48 is arranged near a liquid surface in the stored liquid of the liquid tank 42a, and is oriented to suck the stored liquid and discharge the liquid toward the downstream side (liquid tank 42b side). The suction and discharge of the liquid by the eductor 48 agitates the stored liquid in the liquid tank 42a. The agitation of the stored liquid by the eductor 48 dissolves the products in the stored liquid into the stored liquid and suppresses the products from staying or floating in the stored liquid. The eductor 48, for example, is supplied with the drive liquid from a fluid flow passage 72a, sucks the stored liquid, and discharges it along with the drive liquid.

The treatment casing 50 is connected to the liquid tank casing 40 and discharges the process gas flowing from the liquid tank casing 40 after further exclusion treatment. The treatment casing 50 includes a shower tank 51a, a shower tank 51b, and a shower tank 51c. The shower tank 51a is separated from the shower tank 51b by a wall 50a, and the shower tank 51b is separated from the shower tank 51c by a wall 50b. In this embodiment, a liquid tank 42b and a liquid tank 42c are provided under the shower tanks 51a and 51b, respectively.

The liquid tank 42b is partitioned from the liquid tank 42a by the wall 47, and is configured so that the liquid overflowing the weir 44 below the opening 47a in the wall 47 flows into it. The downstream side of the liquid tank 42b is partitioned from the liquid tank 42c by the wall 50a, so that the liquid in the liquid tank 42b flows into the liquid tank 42c through the filter 45 provided in the opening of the wall 50a.

The liquid tank 42c is partitioned from the liquid tank 42b by the wall 50a and is located downstream of the liquid tank 42b. The liquid from the liquid tank 42b flows into the liquid tank 42c after products and other foreign substances have been removed by the filter 45. The eductor 48b is arranged in the liquid tank 42c. The eductor 48b is oriented to discharge liquid toward the filter 45. The discharge of the liquid by the eductor 48b suppresses a clogging of the filter 45. A water level meter 41 is provided in the liquid tank 42C, and the water level of the liquid tank 42c is controlled to be within a predetermined range (between a predetermined first threshold and a second threshold) by a pump 81 and/or a drain valve 84 described below using a detected value of the water level meter 41.

The first stage shower tank 51a includes two spray nozzles 52 arranged in a vertical line and a spray nozzle or jet nozzle 53 arranged above the spray nozzles 52. The spray nozzles 52 are supplied with the liquid from the liquid flow passage 72b and spray the liquid downward. The spray nozzle or jet nozzle 53 is supplied with the liquid from the liquid flow passage 72b and spray the liquid downward and upward. The process gas from the liquid tank 42a flows through the shower tank 51a from downward to upward and flows into the second stage shower tank 51b near the upper end of the shower tank 51a.

While passing through the shower tank 51a, the process gas comes into contact with the liquid sprayed by the spray nozzles 52, the spray nozzle or injection nozzle 53 and is hydrolyzed. An overpressure exhaust port 65 is provided to an upper part of the shower tank 51a. The overpressure exhaust port 65 relieves the pressure in the tank when excess pressure is applied to the tank.

The second stage shower tank 51b includes a spray nozzle or jet nozzle 53, a spray nozzle 52 arranged below the spray nozzle or jet nozzle 53, and a jet nozzle 54 arranged below the spray nozzle 52. The spray nozzle 52, the spray nozzle or jet nozzle 53 are similar to the spray nozzles 52, the spray nozzle or jet nozzle 53 arranged in the first stage shower tank 51a, and is supplied with the liquid from the liquid flow passage 72b. The jet nozzle 54 is supplied with the liquid from the liquid flow passage 72a and sprays the liquid against the liquid surface in the liquid tank 42c.

The process gas from the shower tank 51a flows through the shower tank 51b from upward to downward, and flows from the lower end of the shower tank 51b into the third stage shower tank 51c. While passing through the shower tank 51b, the process gas comes into contact with and is hydrolyzed by the liquid sprayed or injected by the spray nozzle 52, the spray nozzle or jet nozzle 53, and the jet nozzle 54. The liquid sprayed by the jet nozzle 54 agitates the products floating on the surface of the liquid in the liquid tank 42c and dissolves them into the liquid.

The final stage shower tank 51c includes two raschig ring layers 57 arranged side by side above and below, a spray nozzle 55 that sprays the liquid toward the lower raschig ring layer 57, and a spray nozzle 56 that sprays the liquid toward the upper raschig ring layer 57. A mist trap 61 is connected to an upper end of the shower tank 51c, and the process gas is discharged from an exhaust port 62 through the mist trap 61.

The raschig ring layer 57 is configured to prevent a generation of mist, and is formed by laminating a number of resin rings. The spray nozzle 55 receives a supply of the liquid from the liquid flow passage 72b and sprays the liquid downward toward the lower raschig ring layer 57. The spray nozzle 56 receives a supply of fresh water (e.g., city water) from liquid flow passage 63 and sprays the liquid downward toward the upper raschig ring layer 57. A flow meter 64 is provided in the liquid flow passage 63, and the amount of fresh water supplied to the spray nozzles 56 is controlled based on the detected value of the flow meter 64.

The mist trap 61 includes one or more baffle plates to remove moisture from the atomized process gas and discharge the process gas in a gaseous state. The process gas from the shower tank 51b flows upward from the bottom through the shower tank 51c, comes into contact with the liquid sprayed by the spray nozzles 55 and 56, is further hydrolyzed, is returned to the gaseous state by the mist trap 61, and is discharged from the outlet 62.

The exhaust gas treatment apparatus 10 of this embodiment includes a pump 81 for pumping the liquid discharged from the liquid outlet 43 of the liquid tank 42c. The liquid flow passages 71 and 72 connected to the pump 81 may be provided with a removal mechanism (not shown) for removing foreign matter, etc., contained in the liquid. The pump 81 supplies the liquid discharged from the liquid outlet 43 to the spray nozzles 46 and 52 and the jet nozzles 54 via the fluid flow passages 72 and 72a.

The pump 81 supplies the liquid discharged from the liquid outlet 43 to the spray nozzles 52, the spray nozzles or jet nozzles 53, the spray nozzle 55, and the spray nozzle 56 via the liquid flow passages 72 and 72b. The pump 81 also supplies the liquid discharged from the liquid outlet 43 to the liquid film forming portion 26 of the suction casing 20 via the liquid flow passages 72 and 72c. In this manner, by reusing the liquid stored in the liquid tanks 42a to 42c it is possible to lower the running cost and contribute to environmental protection.

A flow meter 83 is provided in the fluid flow passage 72c. By controlling the pump 81 based on a detection result of the flow meter 83, the flow rate of the liquid to the fluid film forming portion 26 can be adjusted to appropriately control the thickness of the liquid film Lf and the like. For example, the thickness of the liquid film Lf is controlled so that the pressure drop of the process gas is suppressed and a scattering of the products is suppressed. The flow meter 83 may be a flow control valve that has a function of controlling the flow rate in addition to detecting the flow rate. For example, a CLC (closed loop controller) can be employed to automatically control the flow control valve so that the flow rate becomes a set value based on the detected value of the flow meter. A flow meter 82 may be installed in the fluid flow passage 72 to monitor and control the overall flow rate of the liquid from the pump 81. The flow meter 82 can have the same function of controlling the flow rate as the flow meter 83.

The liquid discharged from the liquid outlet 43 by the pump 81 is discharged to an outside of the exhaust gas treatment apparatus 10 through the fluid flow passage 71 in accordance with the opening and closing of the discharge valve 84 provided in the fluid flow passage 71. In one example, the pump 81 is constantly operated for circulation of the liquid during treatment of the process gas, and the opening and closing of the discharge valve 84 is controlled so that the water level in the liquid tank 42c is within a predetermined range (between a predetermined first threshold and a second threshold) based on the detection value of the water level meter 41 installed in the liquid tank 42c.

According to the above-described embodiment, since the outlet 24 is separated from the liquid surface of the liquid tank 42a, the pressure drop of the process gas flowing out of the outlet 24 can be suppressed, a flow velocity of the process gas can be improved, and a treatment speed of the exhaust gas treatment apparatus can be increased. In addition, the close distance between the outlet 24 and the liquid surface of the stored liquid can suppress the scattering of products to the surroundings.

Further, according to this embodiment, since the liquid tank 42a is an overflow type liquid tank, the height of the liquid surface directly below the outlet 24 can be stabilized, and the increase in pressure drop of the process gas and the scattering of the products can be suppressed.

According to this embodiment, the spray nozzle 46 sprays the liquid to the entire inside of the liquid tank 42a (the entire configuration above the liquid surface) to cover the interface in the liquid tank 42a with the liquid, thereby suppressing the adhesion of the products to the configuration inside the liquid tank 42a. In addition, since the spray nozzle 46 also sprays the liquid on the portion around the outlet 24 of the suction casing 20, the products generated by the reaction between the process gas and the liquid in the vicinity of the outlet 24 of the suction casing 20 can be dropped into the stored liquid. This suppresses the products from scattering near the outlet 24 of the suction casing 20. In addition, since the liquid film Lf formed in the liquid film forming portion 26 of the suction casing 20 flows out of the outlet 24, scattering of products at the outlet 24 is suppressed in this respect as well.

If the temperature inside the suction casing 20 is low, there is a risk that the products may be generated from the process gas that is sucked into the suction casing 20 due to the temperature drop. If this product adheres to the inside of the suction casing 20, the exhaust gas treatment apparatus 10 may fail or the treatment efficiency of the process gas may decrease.

Therefore, the suction casing 20 of the exhaust gas treatment apparatus 10 includes a process gas suction structure 100 arranged to an upper part of the suction casing 20. The process gas suction structure 100 may be applicable to the exhaust gas treatment apparatus 10 for treating to be made harmless the process gas by bringing it into contact with a liquid. The structure of the process gas suction structure 100 will be described below with reference to the drawings.

Figure 2:
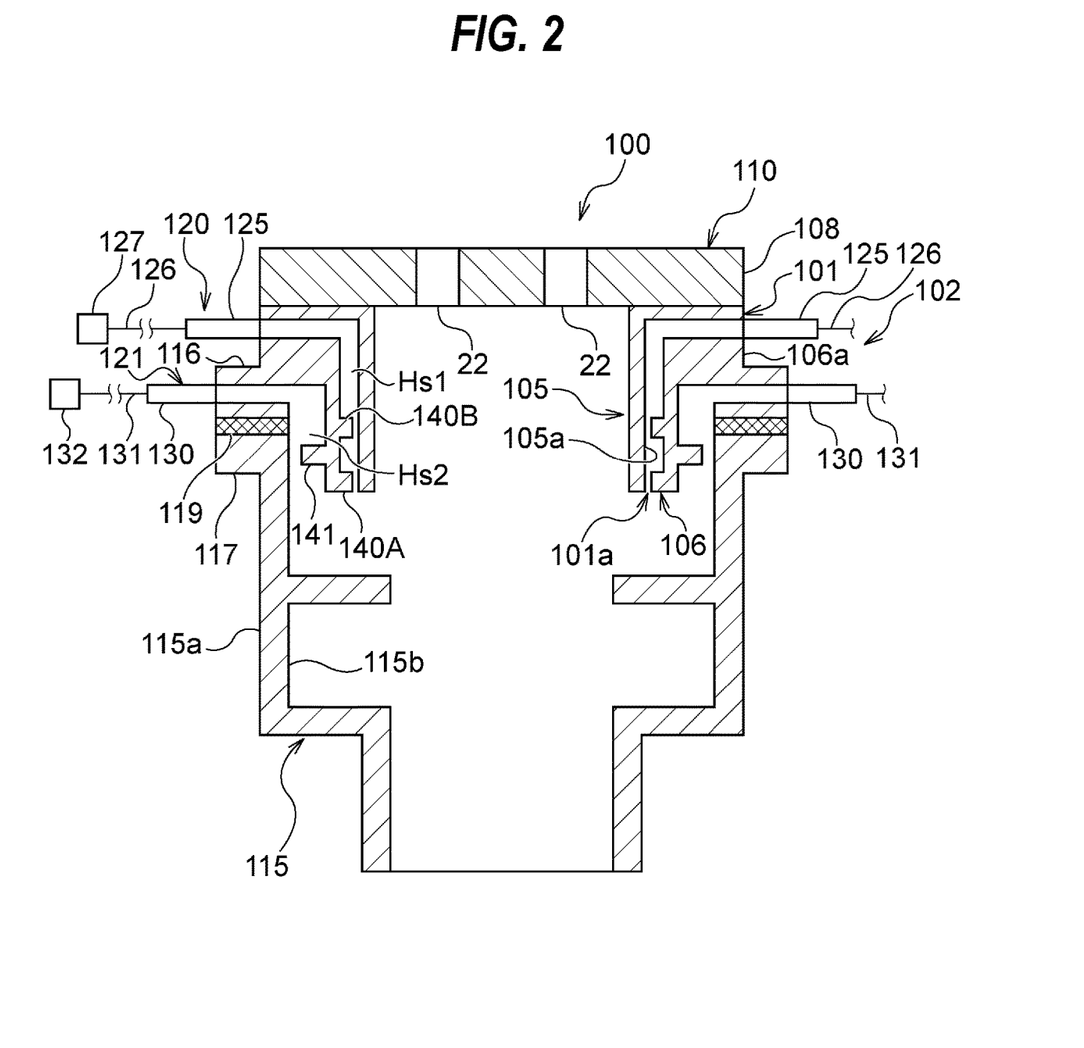
FIG. 2 is a cross sectional view showing a process gas suction structure.

FIG. 2 is a cross sectional view showing the process gas suction structure. The suction pipe 23 and the scraper 32 are not shown in FIG. 2. As shown in FIG. 2, the process gas suction structure 100 includes a double tube structure 101 and a heating device 102 for heating the double tube structure 101. The double tube structure 101 includes a process-gas flow passage portion 105 through which the process gas introduced from the suction port 22 flows, and a partition portion 106 arranged outside the process-gas flow passage portion 105.

Each of the process-gas flow passage portion 105 and the partition portion 106 has a cylindrical shape. The partition portion 106 surrounds the process-gas flow passage portion 105, and the process-gas flow passage portion 105 and the partition portion 106 are concentrically arranged.

The process gas suction structure 100 includes a pipe structure 110 including the suction port 22 and a pipe base 108. The pipe structure 110 is connected to the double tube structure 101 and is arranged above the double tube structure 101. In this state, the pipe structure 110 is connected to the double tube structure 101.

The process gas suction structure 100 includes a wall structure 115 connected to the double tube structure 101. The wall structure 115 is arranged below the double tube structure 101. Therefore, the double tube structure 101 is arranged between the pipe structure 110 and the wall structure 115. The liquid film forming portion 26 shown in FIG.

1 is provided in the wall structure 115, and the liquid film Lf is formed on an inner surface of the wall structure 115.

An annular sealing member (e.g., a gasket) 119 is arranged between the double tube structure 101 and the wall structure 115. More specifically, the double tube structure 101 (more specifically, the partition portion 106) has a flange portion 116 extending outwardly from its outer peripheral surface 106a, and the wall structure 115 has a flange portion 117 extending outwardly from its outer peripheral surface 115a. The sealing member 119 is arranged between the flange portion 116 of the double tube structure 101 and the flange portion 117 of the wall structure 115.

The heating device 102 includes a first heating structure 120 for heating an annular first heating space Hs1 formed between the process-gas flow passage portion 105 and the partition portion 106, and a second heating structure 121 for heating an annular second heating space Hs2 formed between the partition portion 106 and the wall structure 115. The second heating space Hs2 is arranged outside the first heating space Hs1.

In this embodiment, the first heating structure 120 and the second heating structure 121 have the same structure. Each of the first heating structure 120 and the second heating structure 121 is an inert gas supply structure for supplying an inert gas (e.g., nitrogen ($N_2$) gas) heated to a predetermined temperature (e.g., 180° C.) to the double tube structure 101.

According to this embodiment, since the process-gas suction structure 100 includes the heating device 102 for heating the double tube structure 101, the process gas suction structure 100 can prevent a generation of the products from the process gas due to the temperature drop.

The first heating structure 120 includes a first gas supply pipe 125 communicating with the first heating space Hs1, a first gas line 126 connected to the first gas supply pipe 125, and a gas supply source 127 for supplying a heated inert gas to the first heating space Hs1 through the first gas line 126 and the first gas supply pipe 125.

Similarly, the second heating structure 121 includes a second gas supply pipe 130 communicating with the second heating space Hs2, a second gas line 131 connected to the second gas supply pipe 130, and a gas supply source 132 for supplying a heated inert gas to the second heating space Hs2 through the second gas line 131 and the second gas supply pipe 130.

In this embodiment, the first gas supply pipe 125 is arranged above the second gas supply pipe 130 and is connected to an upper part of the partition portion 106. The second gas supply pipe 130 is arranged below the first gas supply pipe 125 and is connected to a lower part of the partition portion 106 (more specifically, the flange portion 116).

Figure 3:
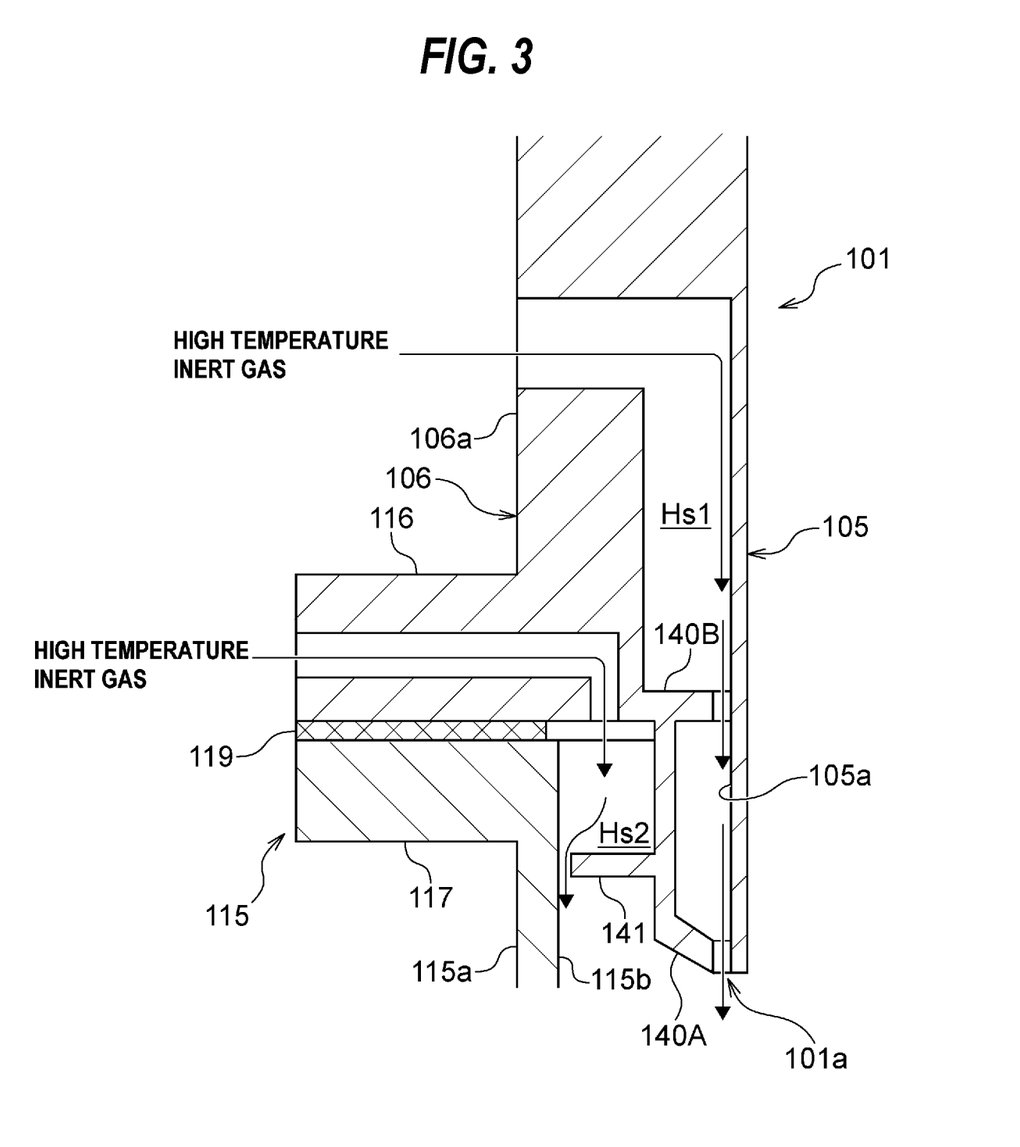
FIG. 3 is a view showing a flow of an inert gas supplied to a double tube structure.

FIG. 3 is a view showing a flow of the inert gas supplied to the double tube structure. As shown in FIG. 3, a high temperature inert gas supplied to the first heating space Hs1 by the first heating structure 120 (i.e., first inert gas supply structure) flows downward along an outer surface 105a of the process-gas flow passage portion 105 and passes through the process-gas flow passage portion 105. The inert gas flowing in this manner contacts the process-gas flow passage portion 105 and the partition portion 106, and maintains surface temperatures of the process-gas flow passage portion 105 and the partition portion 106 at a high temperature.

As shown in FIG. 3, the double tube structure 101 includes aperture portions 140A and 140B that narrow a flow passage of the inert gas supplied from the first heating structure 120 and passing through the first heating space Hs1. The aperture portion 140A is a lower end side aperture portion arranged at a lower end of the partition portion 106. The aperture portion 140B is an upper side aperture portion arranged above the aperture portion 140A. In this specification, the lower end side aperture portion 140A and the upper side aperture portion 140B may be referred to simply as the aperture portion 140 without distinguishing between them.

In this embodiment, two aperture portions 140A and 140B are provided, but in one embodiment, one aperture portion 140 may be provided, and in other embodiments, three or more aperture portions 140 may be provided.

Each of the aperture portions 140A and 140B has an annular shape and extends from the partition portion 106 toward the process-gas flow passage portion 105. The flow passage of the inert gas in the first heating space Hs1 is smaller at a position adjacent to the outer surface 105a of the process-gas flow passage portion 105.

As shown in FIG. 3, the high temperature inert gas supplied to the second heating space Hs2 by the second heating structure 121 (i.e., second inert gas supply structure) flows downward along the inner surface 115b of the wall structure 115 and passes through the partition portion 106. The inert gas flowing in this manner contacts the partition portion 106 and the wall structure 115 to maintain the surface temperatures of the partition portion 106 and the wall structure 115 at a high temperature. In particular, since the liquid film Lf (see FIG. 1) is formed on the inner surface 115b of the wall structure 115, the temperature of the wall structure 115 may decrease. By bringing the high temperature inert gas into contact with the wall structure 115, the second heating structure 121 can maintain the surface temperature of the wall structure 115 at a high temperature.

The double tube structure 101 includes an aperture portion 141 that narrows the flow passage of the inert gas supplied from the second heating structure 121 and passing through the second heating space Hs2. The aperture portion 141 has an annular shape and extends from the partition portion 106 to the wall structure 115. The flow passage of the inert gas in the second heating space Hs2 is smaller at a position adjacent to the inner surface 115b of the wall structure 115. In this embodiment, one aperture portion 141 is provided, but in one embodiment, two or more aperture portions 141 may be provided.

Figure 4:
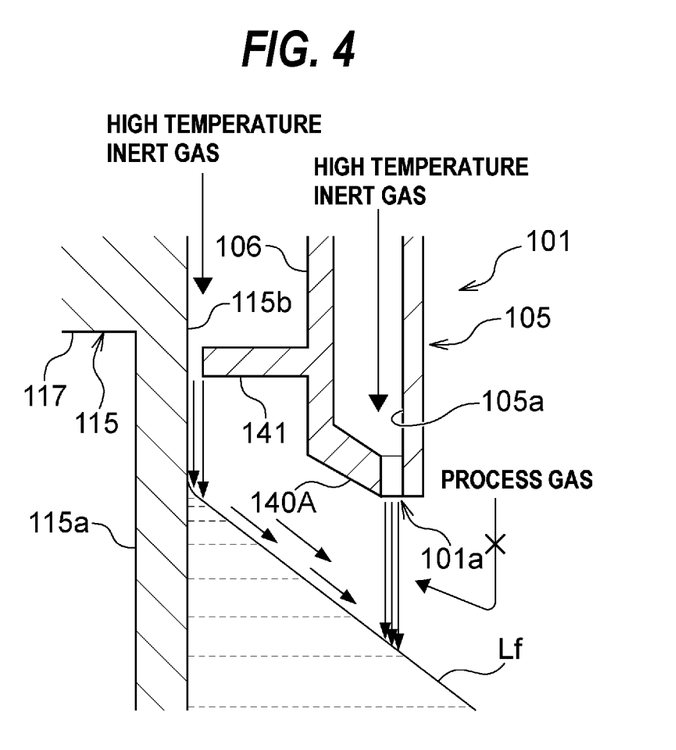
FIG. 4 is a view showing an effect of the double tube structure including an aperture portion.

FIG. 4 is a view showing an effect of the double tube structure including the aperture portion. As described above, the formation of the aperture portions 140, 141 reduces the cross sectional area of the inert gas flow passage, and as a result, the inert gas flows downward vigorously. If a flow velocity of the inert gas is small, the inert gas may flow downward in a biased manner in a circumferential direction of the double tube structure 101. In other words, the inert gas may flow aggressively only in a certain area in a circumferential direction of the double tube structure 101, and may not flow much in other area. Such an uneven flow of the inert gas may cause the temperature drop in the suction casing 20.

In this embodiment, each of the aperture portions 140A, 140B arranged in the first heating space Hs1 and the aperture portion 141 arranged in the second heating space Hs2 reduces the cross sectional area of the flow passage of the inert gas. Therefore, the process gas suction structure 100 can flow the inert gas vigorously, and as a result, it can reliably prevent the inert gas from flowing downward in a biased manner in the circumferential direction of the double tube structure 101.

As shown in FIG. 4, the inert gas passing through a gap between the lower end side aperture portion 140A and the outer peripheral surface 105a of the process-gas flow passage portion 105 flows vigorously to the liquid film Lf located below a tip portion 101a of the double tube structure 101. The inert gas flowing in this manner has an annular shape and extends in a curtain shape, and is formed outside the process gas to surround the process gas flowing through the process-gas flow passage portion 105. Therefore, the flow of the inert gas formed in a curtain shape impedes the flow of the process gas radially outward in the radial direction of the process-gas flow passage portion 105. As a result, the process gas passing through the process-gas flow passage portion 105 flows smoothly downward along the pipe 21 without diffusion.

The inert gas passing through a gap between the inner surface 115b of the wall structure 115 and the aperture portion 141 also flows vigorously to the liquid film Lf located below the aperture portion 141. The inert gas flowing in this manner has an annular shape and extends in a curtain shape, and is formed to surround the inert gas passing through the gap between the lower end side aperture portion 140A and the outer peripheral surface 105a of the process-gas flow passage portion 105. Therefore, the flow of the process gas outward in the radial direction of the process-gas flow passage portion 105 is prevented more reliably.

According to this embodiment, the heating device 102 can form a flow of the inert gas extending in the form of a double curtain formed on the outside of the process-gas flow passage portion 105, which not only heats the double tube structure 101, but also reliably prevents diffusion of the process gas passing through the process-gas flow passage portion 105.

As shown in FIG. 4, since the tip portion 101a of the double tube structure 101 is arranged adjacent to the liquid film Lf, the temperature of this tip portion 101a becomes particularly low. According to the embodiment, as shown by the arrows in FIG. 4, the heating device 102 can bring not only the inert gas passing through the first heating space Hs1 but also the inert gas passing through the second heating space Hs2 into contact with the tip portion 101a of the double tube structure 101. Therefore, the heating device 102 can prevent the temperature of the tip portion 101a from dropping.

Figure 5:
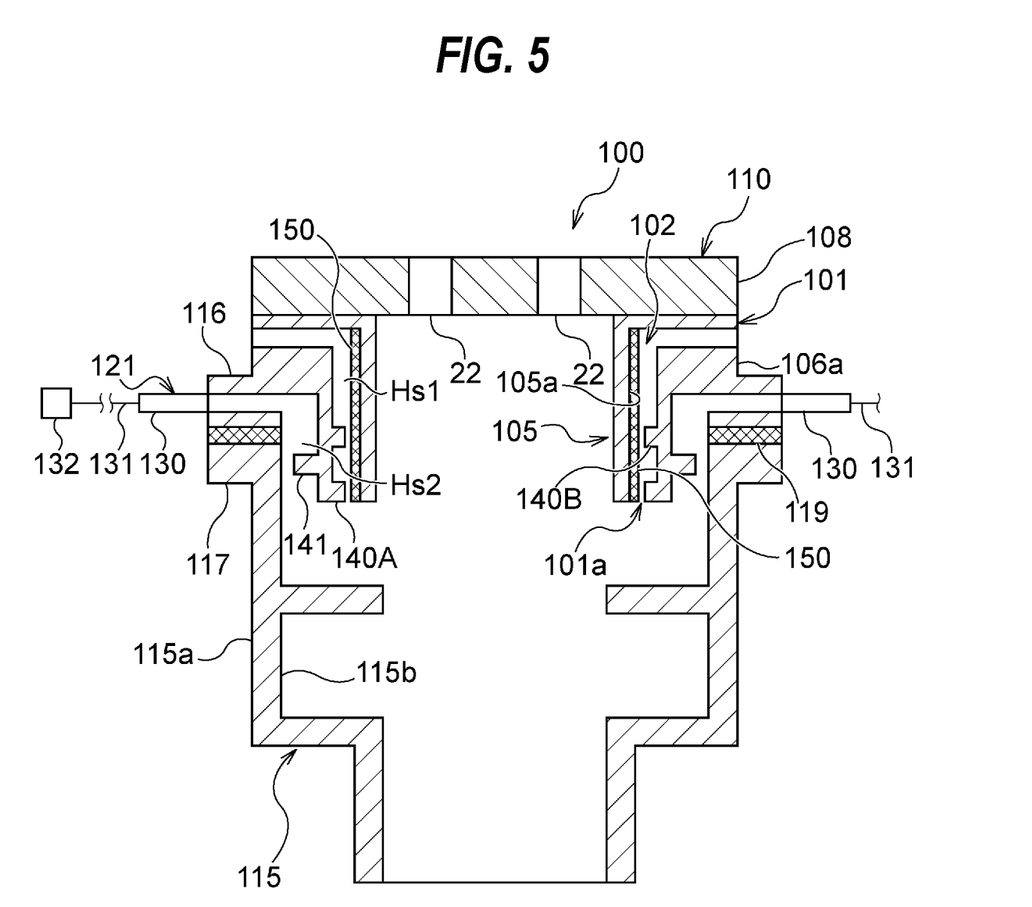
FIG. 5 is a view showing another embodiment of a heating device.

FIG. 5 is a view showing another embodiment of the heating device. As shown in FIG. 5, the heating device 102 may include a heater 150 arranged in the first heating space Hs1. The heater 150 is not particularly limited if it can heat the double tube structure 101 to a predetermined temperature (e.g., 180° C.). For example, the heater 150 may be a cartridge heater or a sheet heater. If the cartridge heater is employed, a plurality of heaters 150 may be arranged at equal intervals along the circumferential direction of the process-gas flow passage portion 105. If the sheet heaters are employed, the heaters 150 may be wrapped around the process-gas flow passage portion 105.

The heater 150 arranged in the first heating space Hs1 can heat the double tube structure 101 (i.e., the process-gas flow passage portion 105 and the partition portion 106). In this embodiment, the heater 150 is arranged adjacent to the process-gas flow passage portion 105 and can therefore actively heat the process-gas flow passage portion 105. In one embodiment, the heating device 102 may include both the first inert gas supply structure 120 and the heater 150, as long as the high temperature inert gas can pass through the first heating space Hs1.

Although not shown in the drawings, the heating device 102 may further include a heater arranged in the second heating space Hs2. Even in this case, the heating device 102 may include both the second inert gas supply structure 121 and the heater (not shown), as long as the high temperature inert gas can pass through the second heating space Hs2.

Figure 6:
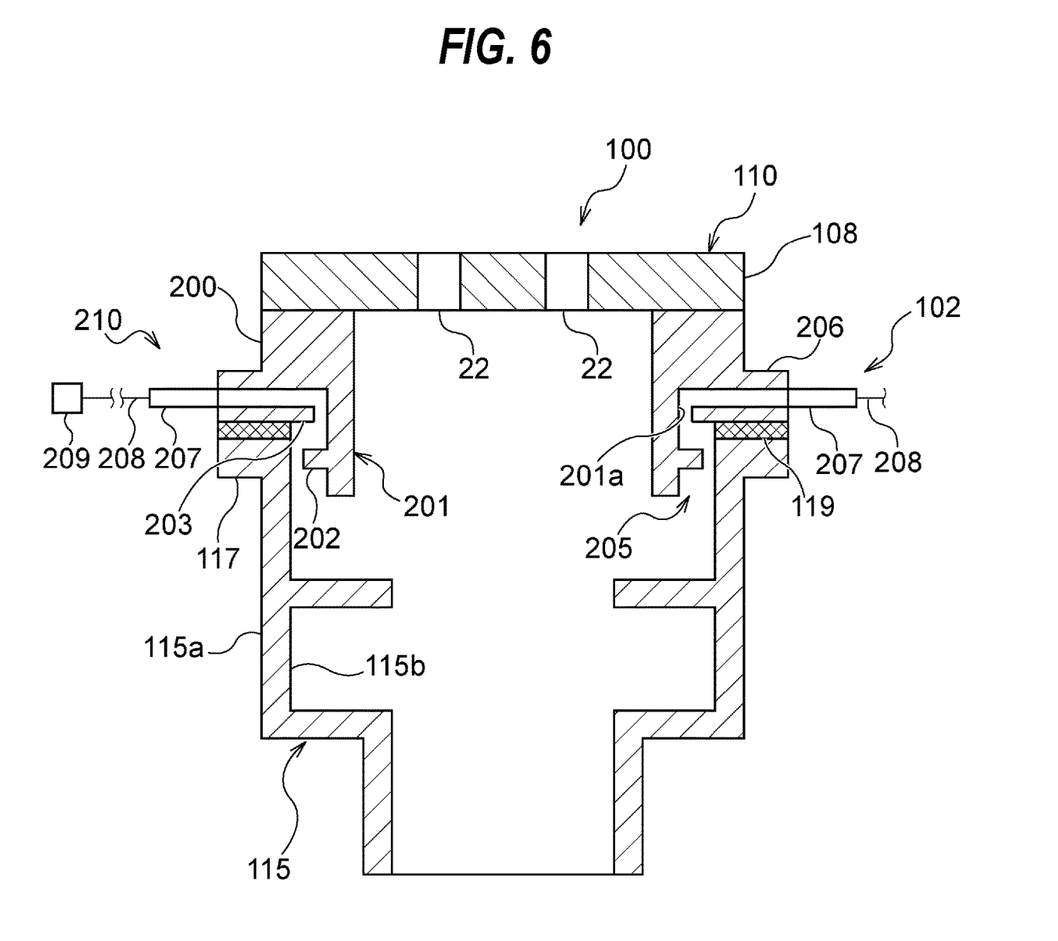
FIG. 6 is a view showing another embodiment of the process gas suction structure.

FIG. 6 is a view showing another embodiment of the process gas suction structure. As shown in FIG. 6, the process gas suction structure 100 includes an annular flow passage structure 200 through which the high temperature inert gas flows, and a heating device 210 for heating the annular flow passage structure 200. The annular flow passage structure 200 includes a process-gas flow passage portion 201 through which the process gas flows, and an annular zigzag flow passage portion 205 arranged outside the process-gas flow passage portion 201.

The wall structure 115 is formed on the outside of the process-gas flow passage portion 201. Each of the process-gas flow passage portion 201 and the wall structure 115 has a cylindrical shape, and the wall structure 115 surrounds the process-gas flow passage portion 201. The process-gas flow passage portion 201 and the wall structure 115 are concentrically arranged.

The zigzag flow passage portion 205 includes a first annular projection 202 formed on an outer surface 201a of the process-gas flow passage portion 201 and a second annular projection 203 extending in a direction proximate to the outer surface 201a of the process-gas flow passage portion 201. The first annular projection 202 and the second annular projection 203 are concentrically arranged with respect to each other. The second annular projection 203 is arranged above the first annular projection 202.

The annular flow passage structure 200 has a flange portion 206 that can be connected to the flange portion 117 of the wall structure 115, and the second annular projection 203 is connected to the flange portion 206 and extends toward the outer surface 201a. In one embodiment, the second annular projection 203 may be formed on an inner surface 115b of the wall structure 115 arranged outside the process-gas flow passage portion 201.

The heating device 210 includes a heating structure (inert gas supply structure in this embodiment) 102 for supplying a heated inert gas (e.g., nitrogen ($N_2$) gas) to the zigzag flow passage portion 205. As shown in FIG. 6, the inert gas supply structure 102 includes a gas supply pipe 207 communicating with the zigzag flow passage portion 205, a gas line 208 connected to the gas supply pipe 207, and a gas supply source 209 for supplying a heated inert gas to the zigzag flow passage portion 205 through the gas line 208 and the gas supply pipe 207.

Figure 7:
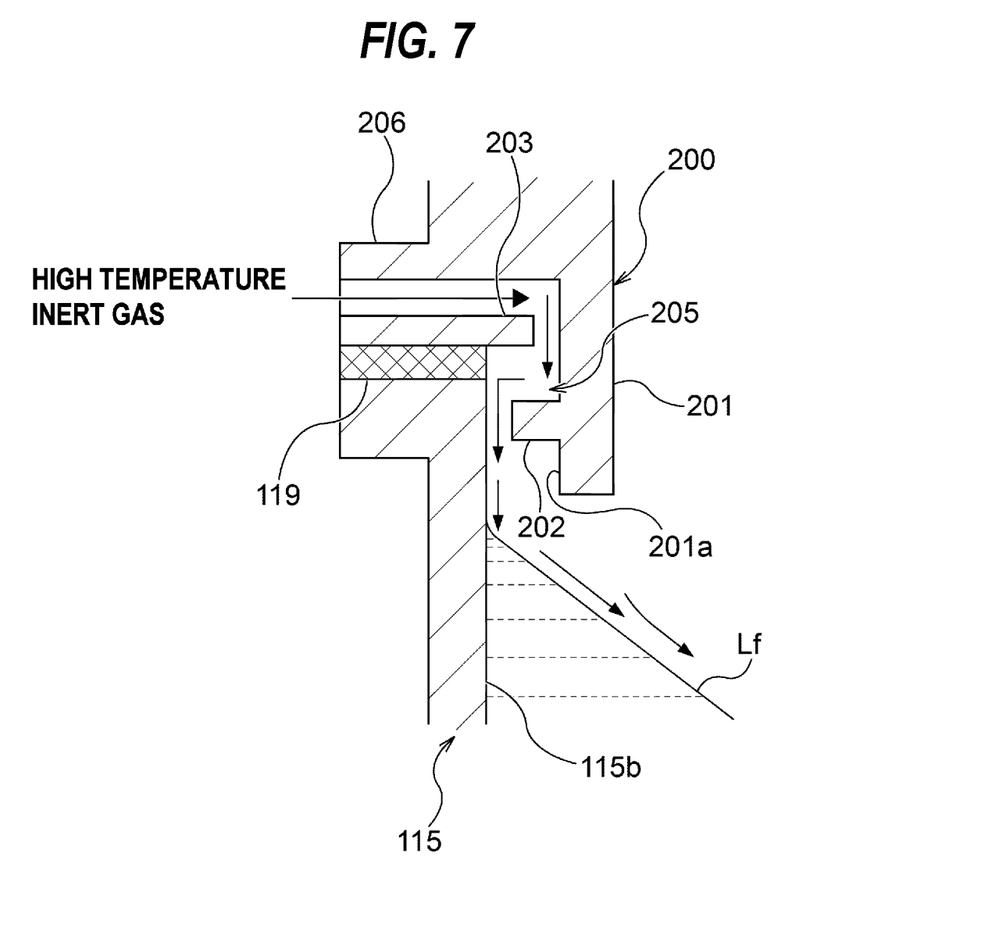
FIG. 7 is a view showing a flow of a high temperature inert gas supplied to a zigzag flow passage portion.

FIG. 7 is a view showing a flow of a high temperature inert gas supplied to the zigzag flow passage portion. Each of the first annular projection 202 and the second annular projection 203 has an annular shape with respect to each other, and the second annular projection 203 and the first annular projection 202 are arranged in this order in the direction of the inert gas flow.

Therefore, the inert gas introduced into the zigzag flow passage portion 205 swirls and flows so as to surround the process-gas flow passage portion 201, and flows into the gap between the second annular projection 203 and the first annular projection 202. This gap is an annular space formed between the process-gas flow passage portion 201 and the wall structure 115. The inert gas flowing into this space swirls and flows while heating the process-gas flow passage portion 201 and the wall structure 115, and flows below the second annular projection 203 and the first annular projection 202.

As shown in FIG. 7, the inert gas passing through the second annular projection 203 and the first annular projection 202 vigorously flows to the liquid film Lf located below the process-gas flow passage portion 201. The inert gas flowing in this manner has an annular shape and extends in a curtain shape. Also in the embodiment shown in FIGS. 6 and 7, the process gas suction structure 100 can prevent the product from being generated from the process gas due to the temperature drop.

Although the embodiments have been described above, it should be understood that the present invention is not limited to the above embodiments, and various changes and modifications may be made without departing from the scope of the appended claims.

What is claimed is:

1. A process gas suction structure applicable to an exhaust gas treatment apparatus for treating to be made harmless a process gas by contacting it with a liquid, the process gas suction structure comprising:
    a double tube structure; and
    a heating device configured to heat the double tube structure,
    wherein the double tube structure comprises:
        a process-gas flow passage portion where the process gas flows; and
        a partition portion arranged outside of the process-gas flow passage portion.

2. The process gas suction structure according to claim 1, wherein the process gas suction structure comprises a wall structure connected to the double tube structure, and
    wherein the heating device comprises:
        a first heating structure configured to heat a first heating space formed between the process-gas flow passage portion and the partition portion; and
        a second heating structure configured to heat a second heating space formed between the partition portion and the wall structure.

3. The process gas suction structure according to claim 2, wherein the first heating structure comprises at least one of a first inert gas supply structure configured to supply a heated inert gas to the first heating space and a heater arranged to the first heating space, and
    wherein the second heating structure comprises at least one of a second inert gas supply structure configured to supply a heated inert gas to the second heating space and a heater arranged to the second heating space.

4. The process gas suction structure according to claim 3, wherein the double tube structure comprises:
    an aperture portion configured to narrow a flow passage of an inert gas supplied from the first inert gas supply structure and passing through the first heating space; and
    an aperture portion configured to narrow a flow passage of an inert gas supplied from the second inert gas supply structure and passing through the second heating space.

5. A process gas suction structure applicable to an exhaust gas treatment apparatus for treating to be made harmless a process gas by contacting it with a liquid, comprising:
    an annular flow passage structure; and
    a heating device configured to heat the annular flow passage structure,
    wherein the annular flow passage structure comprises:
        a process-gas flow passage portion where the process gas flows; and
        an annular zigzag flow passage portion arranged outside the process-gas flow passage portion.

6. The process gas suction structure according to claim 5, wherein the zigzag flow passage portion comprises:
    a first annular projection formed an outer surface of the process-gas flow passage portion; and
    a second annular projection extending in a direction proximate to the outer surface of the process-gas flow passage portion.

7. The process gas suction structure according to claim 5, wherein the heating device comprises an inert gas supply structure configured to supply a heated inert gas to the zigzag flow passage portion.

8. An exhaust gas treatment apparatus, comprising:
    a suction casing comprising a process gas suction structure according to claim 1; and
    a liquid film forming portion configured to form a liquid film on an inner wall surface of the suction casing.

* * * * *